United States Patent
Cardinale et al.

(10) Patent No.: US 8,450,642 B2
(45) Date of Patent: May 28, 2013

(54) OPERATING HEAD, PARTICULARLY FOR A LASER MACHINE

(75) Inventors: Matteo Cardinale, Collegno (IT); Massimiliano Carracoi, Collegno (IT); Cataldo Tarantini, Collegno (IT)

(73) Assignee: Prima Industrie S.p.A., Collegno (Turin) (IT)

( * ) Notice: Subject to any disclaimer, the term of this patent is extended or adjusted under 35 U.S.C. 154(b) by 696 days.

(21) Appl. No.: 12/580,563

(22) Filed: Oct. 16, 2009

(65) Prior Publication Data

US 2010/0096372 A1 Apr. 22, 2010

(30) Foreign Application Priority Data

Oct. 17, 2008 (EP) .................................... 08425673

(51) Int. Cl.
*B23K 26/08* (2006.01)

(52) U.S. Cl.
USPC .................................................... 219/121.78

(58) Field of Classification Search
USPC .............................. 219/121.11, 121.6–121.86
See application file for complete search history.

(56) References Cited

U.S. PATENT DOCUMENTS

| 4,728,771 | A | * | 3/1988 | Sartorio | 219/121.72 |
| 5,708,251 | A | * | 1/1998 | Naveh | 219/121.66 |
| 6,064,033 | A | * | 5/2000 | Carbonato et al. | 219/121.78 |
| 2001/0022297 | A1* | | 9/2001 | Gilly | 219/121.78 |
| 2002/0003132 | A1* | | 1/2002 | Scalzotto | 219/121.78 |
| 2003/0192867 | A1* | | 10/2003 | Yamazaki et al. | 219/121.78 |

* cited by examiner

*Primary Examiner* — David Vu
*Assistant Examiner* — Jonathan Han
(74) *Attorney, Agent, or Firm* — Nixon & Vanderhye P.C.

(57) ABSTRACT

A management method for a redundant axis laser machine of the type comprising a movable structure controlled by actuators and operated according to a first set of variables (X, Y, Z, A) and an operating head operated according to a second set of said variables (W, B, C), said first set of variables (X, Y, Z, A) and second set of variables (W, B, C) identifying one or more redundant variables. Such method envisions a filtering allowing the work trajectory to be decomposed into defined trajectories for a first low dynamic system made up of said first set of variables (X, Y, Z, A) and a second high dynamic system made up of said second set of said variables (W, B, C), respectively.

14 Claims, 5 Drawing Sheets

OPERATING HEAD, PARTICULARLY FOR A LASER MACHINE

This application claims priority to European Patent Application No. 08425673.4 filed 17 Oct. 2008, the entire contents of which is hereby incorporated by reference.

The present invention concerns an operating head, in particular for a laser machine. An operating head for a laser machine is known from the document EP927596 by the same Applicant comprising a supporting base with a first mirror adapted to receive a laser beam along a first axis and to deflect it along a second axis. A rotating body is rotatably mounted on the base around the second axis and supports a terminal body movable with respect to the rotating body in the direction of the second axis. A first motor carried by the base controls the rotation of the rotating body by means of a transmission mechanism including a pair of conical gears. A second motor is carried by the terminal body and drives its movement by means of a gear wheel that is connected to the motor by means of a belt and cooperates with a stationary rack.

A head of the type described above allows the laser beam to be moved at high speed along short two-dimensional paths without moving the main axes of the machine.

From document EP1134052 by the same Applicant an operating head for a laser machine is known, having the features disclosed in the preamble of the main claim, and improving the operating head of the document EP927596 reducing the number of components and realising a simpler head with a lower inertia of the moving parts.

Within such context, the present invention has the object of providing further improvements, and particularly, of increasing the movement precision and versatility of the above-indicated operating heads.

According to the present invention, such object is achieved by an operating head having the features forming scope of the main claim. Further advantages are obtained thanks to the features of the dependent claims.

Furthermore, the present invention has the object of increasing the performance of machines provided with operating heads according to claims 1 to 8 envisaging a control method for such machine having the features of claim 9. Preferred embodiments of such method are presented in dependent claims 10 and 11.

The present invention will now be described in detail with reference to the attached drawings, provided by way of non-limiting example, in which.

Figure 1:
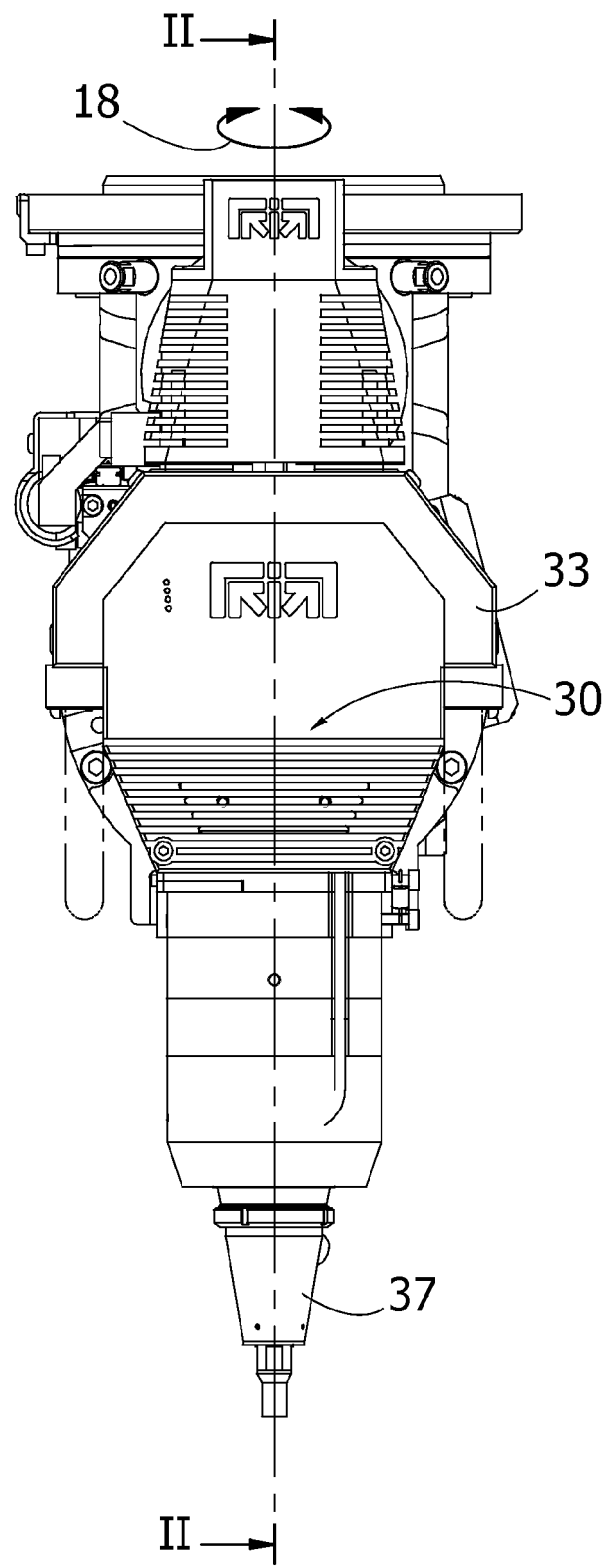
FIG. 1 is a frontal view of an operating head according to the present invention.

With reference to the drawings, an operating head for a laser machine is indicated with 10. The head 10 comprises a base 12 having an engagement section 14 intended to be fixed to the terminal part of a movable body (not illustrated) of a laser machine. With reference to FIG. 2, the base 12 carries a first mirror 16 that when in use receives a laser beam along a first axis A and bends it 90° along a second axis B. Preferably, the base 12 revolves around the axis A as indicated by the double arrow 18 in FIGS. 1 and 2. On the base 12, at the intersection between the mirror 16 and the first axis A, a flange centre CF of the operating head 10 is defined. With reference to FIG. 2, the head 10 comprises a rotating body 20 which is rotatably supported by the base 12 around the axis B by a pair of bearings 22. In the embodiment illustrated by way of example in the figures, the rotating body 20 is formed by a tubular element arranged coaxially with axis B. A second tubular element 24 is arranged internally to the rotating body 20. The second tubular element 24 is connected to the rotating body 20 by a linear prismatic guide that allows the second tubular element 24 to move in the direction of the axis B and connects the tubular elements 20, 24 rigidly together for the rotational movements around the axis B in the direction indicated by the double arrow 26 in FIG. 2.

A terminal body 30 is fixed to the second tubular element 24 and is movable together with the latter in the direction indicated by the double arrow W in FIG. 2. The terminal body 30 supports a second mirror 34 receiving the laser beam along the axis B and reflecting it at 90° in the direction of a third axis C. The beam reflected by the mirror 34 is then directed to a focal lens 35, that, as will be described in the following, is carried by an operating end 37 of the terminal body 30, movable with respect to the latter along a direction parallel to the third axis C. A capacitive sensor adapted to detect the distance between the focal lens 35 and the pieces to be welded is also located in the operating end 37, below the focal lens 35 (with reference to FIG. 2).

With reference to FIG. 2, a first direct motor 36 has a stator 38 fixed to the body 12 and a rotor 40 fixed to the rotating body 20. The motor 36 controls the rotation of the terminal body 30 around the axis B without the need for reduction mechanisms. Direct motors, known by themselves, can work with very small angles (in the order of $10^{-3}$°) with high torque and resolution, with a 1:1 transmission ratio with respect to the movable member to which it is associated and without reduction gear mechanisms or kinematic members (belts, pulleys, etc.).

A second direct motor 42 controls the movement of the terminal body 30 along the direction indicated by the double arrow W. In particular, the second direct motor 42 comprises a stator 43 supported by the base 12 and a rotor 44 fixed to the internal thread 45a of a ball screw 45. The internal element 45b of the ball screw engages a flange 46 mounted on a fastening flange 47 of the terminal body 30 of the tubular element 24 with an interposed bearing 50. The bearing 50, which in the embodiment in the figures is a cross roller bearing, has the function of connecting the terminal body 30 to the ball screw 45 (and specifically to the internal element 45b) for movements in the direction W, and to disengage it instead from the latter for rotational movements around the second axis B.

Thanks to said configuration, by the effect of the rotation of the internal thread 45a, actuated by motor 42, the terminal body 30 is drawn in translation along the second axis B of the internal element 45b of the ball screw 45.

As was already mentioned, the operating end 37 of the terminal body 30 is mounted so that is able to translate with respect to the latter along the third axis C perpendicular to the second axis B. Such movement is effected by means of the action of a second ball screw 48 controlled by a third motor 53.

Figure 2:
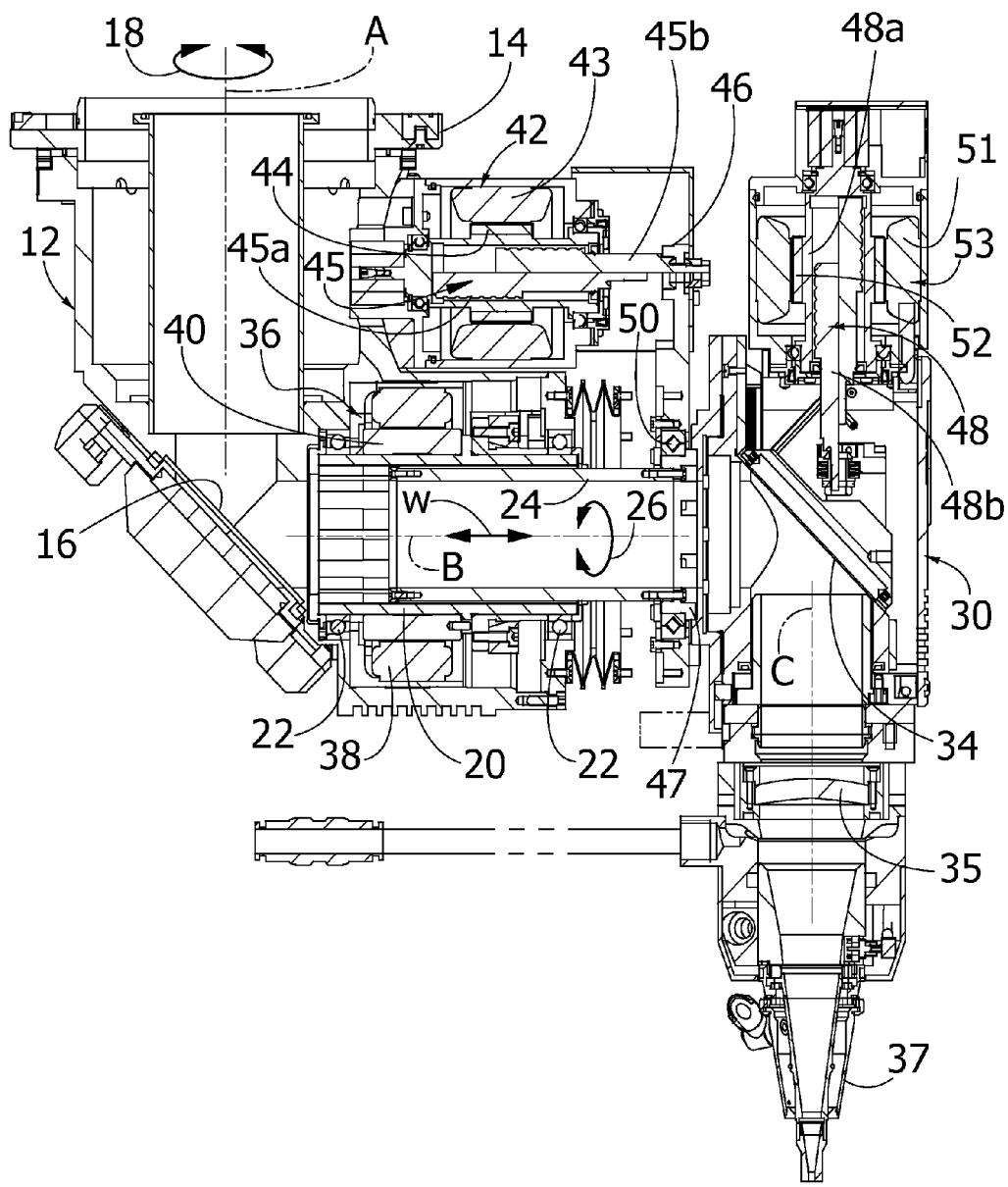
FIG. 2 is a section along the line II-II in FIG. 1.

In particular, the third motor 53 comprises a stator 51 that is movable along the third axis C with respect to the terminal body 30 and fixed to the internal thread 48a of the ball screw 48, which moves in translation integrally with the operating end 37 by means of the external stirrup 33, inverted U-shaped, visible in FIG. 1. Instead, the rotor 52 of the motor 53 is fixed to the internal element 48b of the ball screw 53, which in turn is mounted integral with the terminal body 30 above the mirror 34.

As a result of the above configuration, the rotation of element 52 induced by motor 53 causes a translation of the internal thread 48a and of the stator 51, which draw the operating end 37 with them along the direction of the third axis C.

In the embodiment illustrated in the figures, the direct motors 36, 42 and 53 are oriented along a direction parallel with respect to the respective controlled axes. Such an arrangement is particularly advantageous in that it allows a reduction of the encumbrance of the operating head. The direct rotating motors 42 and 53 could be substituted by linear-type direct motors whose movable part is connected directly to the flange 47 and stator 51, respectively.

The motors 36 and 42 are carried by the base 12. As a consequence, the inertia of the movable bodies is lower, which improves the movement speed of the terminal body 30. The direct motors also allow clearances in the kinematic chain to be eliminated and the number of components in the head 10 to be reduced. The arrangement the motors on the base 12 also allows simplification of the electrical wiring.

Figure 3:
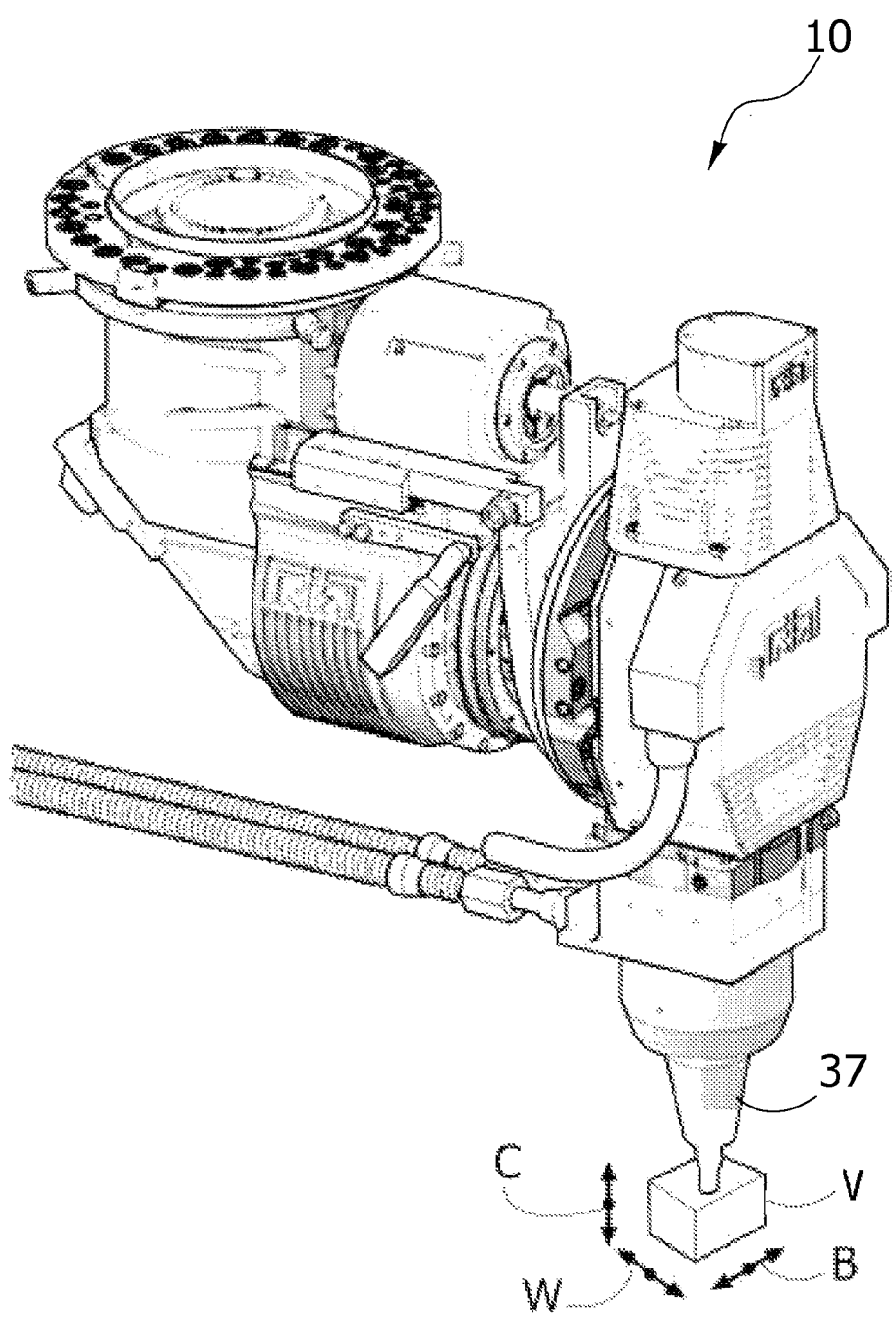
FIG. 3 is a perspective view of the operating head in FIG. 1.

As can be seen in FIG. 3, the translational and rotational movements of the terminal body 30, and the translational movement of the operating end 37 can be combined together to move the laser beam coming out of the head along the axis C, or better an operating reference point T of the operating end 37, known as the Tool Centre Point (TCP), along any trajectory contained in a work volume V whose boundaries are defined by the length of the working strokes of the motors 36, 42, and 53.

In applications the above-described operating head 10 is mounted on the movable structure according to the Cartesian axes X, Y and Z of a laser machine. The laser machine made of the combination of such movable structure with the operating head 10 can be described as a redundant axis machine.

In fact, an operating machine is defined as redundant when the number of its joints (or axes) is greater than the degrees of freedom needed to describe the operating space. This entails infinite possible configurations of the joints realising the desired positioning and orientation for the terminal member.

The combination of the redundant solutions allows a more flexible operating machine to be obtained, both in terms of kinematic configurations and in the interactions with the surrounding environment. In particular the redundancy can be exploited to satisfy the constraints imposed by working space, in order not to violate physical constraints of the operating machine itself and to follow trajectories without collisions.

The fundamental aspect of the analysis of a redundant operating machine is that of managing the redundancy identifying a relationship between the coordinates of the terminal member in cartesian space and that in the space of the joints. In the specific case, the space of the joints is represented by the volume V illustrated in FIG. 3 defined by the amplitude of the working strokes of the motors 36, 42 and 53.

The Applicant has realised a control system for an operating machine comprising an operating head according to the present invention allowing for the best exploitation of the advantageous characteristics of the latter, and in particular to manage the volume of redundancy in an efficient way, in order to guarantee better performance of the machine.

According to the present invention, in applications in which the operating head 10 is installed on an operating machine of the type indicated above, the motors 36, 42 and 53 of the operating head 10 are operationally connected to a numerical control unit. Furthermore, such numerical control unit controls the actuators of the axes X, Y and Z of the movable structure of the machine, and the actuator of the axis A.

Said control unit controls the operation of said motors and actuators according to pre-established programs in function of the requests of the piece processing, and in a coordinated manner. Such programs are arranged to move the operating end 37 within the volume V in FIG. 3, in a substantially continuous way and with extremely high velocity and accelerations, while the movable structure of the machine is moved with relatively low accelerations, in correspondence to its axes X, Y and Z, which define a relatively broad space in which said volume V can be moved, and in correspondence of the axis A to define the orientation of the volume V in the space X, Y and Z.

Thus, the type of control indicated above is obtained by means of providing a filtering, which comprises a first positioning filer and a second orienting filter, that allow the work trajectory to be decomposed into defined trajectories for a first low dynamic system formed by the axes X, Y, Z and A, and for a second high dynamic system formed by the axes W, B and C, respectively. The positioning filter and the orienting filter can operate at filtering frequencies that can also be different.

Thus, the axes X, Y, Z and A of the movable structure of the machine, defining the first system, and transporting over the entire working area of the machine the flange centre CF of the operating head, and therefore the small working volume V of the latter shown in FIG. 3, according to a determined orientation, have a low acceleration, while the axes W, B, C of the operating head 10 (see FIG. 3), defining the second system, have high acceleration. All together the axes of the machine, including the first system and the second system, are seven.

The resulting laser operating machine works in three dimensions, but with redundant cartesian axes that cooperate for the movement of the reference point or TCP.

Therefore, for the control of such laser operating machine it is necessary to coordinate in general the movements of the axes of the first system X, Y, and Z, A and of the axes of the second system W, B and C, taking in account that the axes of the first system X, Y, and Z, A are responsible for transferring the operating end 37 of the operating head 10 continuously over the entire work area, dynamically following the movements of such head 10 without having the axes W, B and C of the operating head 10 arrested to wait for the movement of the axes X, Y, and Z of the mobile system.

Figure 4:
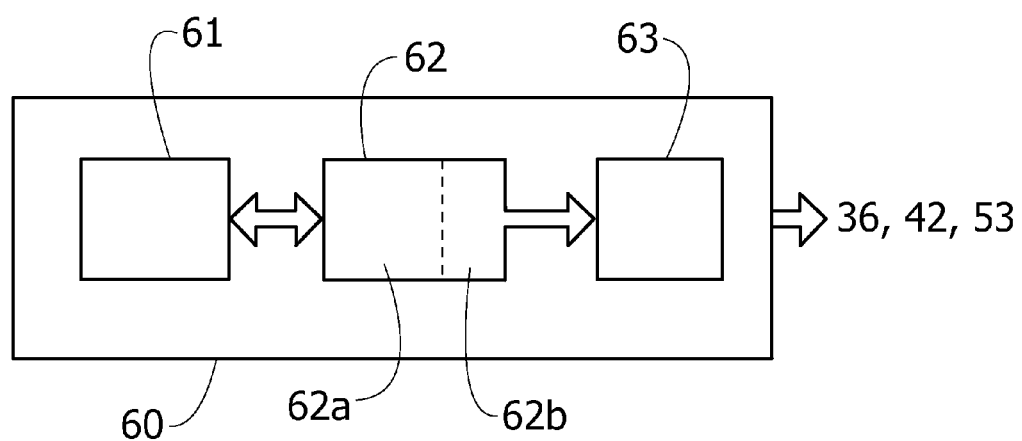
FIG. 4 represents a block diagram of a control unit for a machine comprising the operating head in FIGS. 1 to 3.

In FIG. 4 a schematic diagram is presented of the architecture of a numerical control unit 60 comprising two personal computers 61 and 62 to manage control of the actuators.

The personal computer 61 operates as the user interface to send instructions and commands to the second personal computer 62, which preferably comprises an operating system of the Linux type 62a associated to real-time type extensions 62b for the machine management. Therefore, the personal computer 62 provides the trajectories to be followed to a servo controller board 63 of the DSP PCI type for controlling the actuators.

In the personal computer 62 and in the servo controller board 63 a method is implemented for managing the redundant axes that will be described in detail later.

According to a method known in the state of the art the numerical control unit 60 generates a sequence of instructions P, corresponding to a so-called 'part program' for a "virtual" machine with determined specifications of acceleration and velocity. Such sequence of instructions P comes from the personal computer 51, and is created by an appropriate program, to set the trajectories and movements of the machine off-line. An interpolation function is applied to it, providing the generation of a trajectory of the operating machine on the basis of the sequence of instructions P. Such interpolation operates in response to a preparation code, or G-Code, sent within the sequence of instructions P. The interpolation operation is implemented via software on the personal computer 52.

Figure 5A:
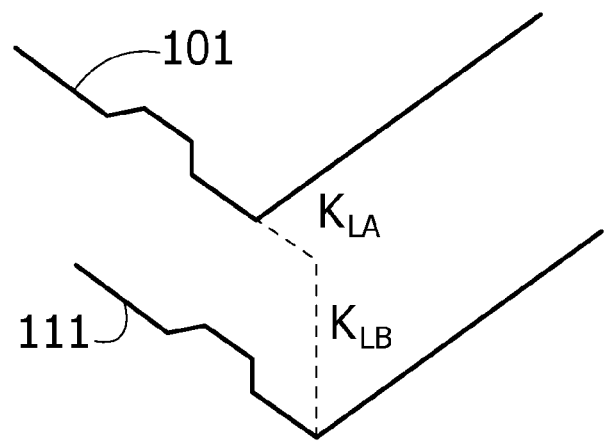
FIGS. 5a-5c represent a schematic diagram exemplifying the operation of the machine comprising the operating head in FIGS. 1 to 3, according to the control method of the present invention.
Figure 5B:
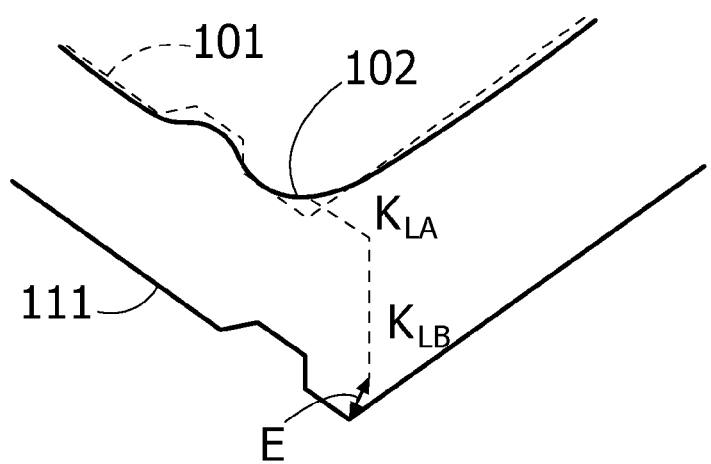
Figure 5C:
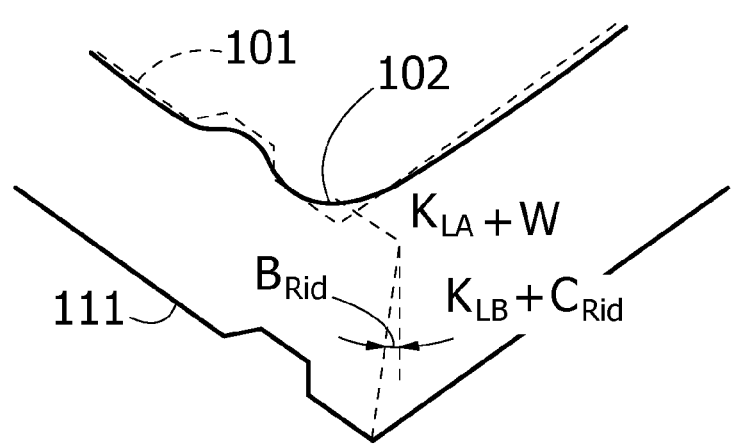

The FIGS. 5a, 5b, 5c show in a schematic way an example of the proposed control method for the redundant axes machine described herein.

In general, such machine operates defining the trajectory of the work reference point T, or TCP, and its inclination as the trajectory of the operating machine. In general this corresponds to providing a relative trajectory of the axes of motion X, Y, Z of the movable structure, rotation around the first axis A providing the orientation of the tool and rotation around the axis B of the operating head establishing the inclination of the work reference point T.

FIG. 5a shows how it is envisaged to obtain such trajectory of the work reference point T by first generating a trajectory of the flange centre CF to be associated with the low dynamic machine, that is, with the axes X, Y, Z to which the orientation axis A is eventually added. Therefore, such trajectory of the flange centre CF allows part of the trajectory of the work reference point T to be subdivided on a lower dynamic machine that operates in real time on the basis of trajectories programmed without considering the existence of redundant axes.

The trajectory of the work reference point T is then completed by means of a trajectory of the high dynamic machine, to be effected in the work volume V, comprising mainly rotation around the inclination axis B.

In FIG. 5a a desired trajectory of the reference point T of the operating head 10 during a determined work cycle is indicated with the line 111. The dashed line 101 represents the trajectory of a predefined point of the operating head guided by the movable structure of the machine, specifically in the example shown the flange centre CF, set according to a conventional control method to obtain the desired trajectory 111. Such desired trajectory 111 corresponds to the trajectory 101 of the flange centre CF offset by the distance defined by a horizontal interaxis KLA and by a vertical interaxis KLB. With reference to FIG. 2, the horizontal interaxis KLA is defined between the first axis A and the third axis C, corresponding substantially to the distance between the centres of the first mirror 16 and the second mirror 34, while the vertical interaxis KLB is defined between the second axis B and the operating reference point TCP, corresponding substantially to the distance between the centre of the second mirror 34 and the operating reference point on the operating end 37.

According to the invention, applying a filtering to such trajectory of the flange centre 101 is provided. In FIG. 5b, the line 102 represents a filtered trajectory that is assigned, for the same purpose, in the control method described above. This is also defined by the axes X, Y, Z, A.

In the control method according the invention such filtered trajectory 102 of the flange centre is then obtained by eliminating the high frequency components of the trajectories of the axes X, Y, Z, A in order to obtain a trajectory containing only low frequency components. Such filtering operation could, for example, envisage the definition of cut-off or threshold frequencies for the respective axes X, Y, Z and possibly for the axis A. The filtered trajectory 102 assigned to the flange centre CF and therefore to the axes of the movable structure of the machine, is less complicated with respect to the one corresponding to the conventional control method, and therefore can be followed by such movable structure with a substantially continuous velocity trend, reducing in this way the inertial forces involved. As can be seen in FIG. 5b, however, the resulting position of the TCP is affected by a position error E with respect to the desired trajectory 111.

Therefore, as is shown in FIG. 5c, it is envisaged to generate the second, high dynamic trajectory of the machine, relative to the axes B, C, W of the operating head, calculating it so to obtain the inclination required by the overall trajectory of the work reference point T and recover the position error E introduced by the filtering. In particular, components are generated along axis W, along axis C, and along axis B that work together to obtain the originally requested positioning of the operating head. Overall, such regulations occur at high dynamics in the small volume V of redundancy, which the operating head 10 can follow by virtue of the presence of motors 36, 42, 53.

When changing the orientation of the tool, as previously mentioned, it is envisaged to consider also the tool orientation axis A as a filtered axis. In such case, two filters are provided, positional and orientational, operating simultaneously with filtering frequencies that can also be different.

Naturally, the details of construction and the embodiments can be widely varied with respect to what has been described and illustrated, without departing from the scope of the present invention, as defined in the claims that follow.

The filtering applied to the trajectories of the machine can be of different types according to the dynamic characteristics to be distributed to the different systems.

The invention claimed is:

1. An operating head of a redundant axes laser machine, comprising a movable structure controlled by actuators and operating according to a first set of variables (X, Y, Z, A), including cartesian axes (X, Y, Z), said operating head operating according to a second set of variables (W, B, C), said first set of variables (X, V, Z, A) and second set of variables (W, B, C) identifying one or more redundant variables, comprising:

a base rotatably associated to a movable structure of a redundant axes laser machine around a first axis (A) comprised in said first set of variables (X, Y, Z, A), a rotating body rotatably supported by the base rotatable around a second axis (B) perpendicular to said first axis (A), a terminal body provided with an operating end, which is supported by the rotating body movable along the direction of the above-said second axis (B), a first motor to control the rotation of the rotating body around said second axis (B), and a second motor to control the movement of the terminal body along said second axis (B), said redundant axes machine comprising a control unit to control said actuators of the movable structure and motors of the operating head and a servo control module to carry out trajectories of said variables in function of a set sequence wherein said control unit is configured to move the operating end along a second trajectory while the movable structure is moved along a first trajectory, said second set of variables (W, B, C) includes also a translation along said third axis (C), and said operating end is mounted on said terminal body so that is able to translate along said third axis (C) perpendicular to said second axis (B), said operating end being movable with respect to said terminal body along a direction parallel to the third axis (C), and in that said head comprises also a third motor to move said operating end along said third axis (C).

2. An operating head according to claim 1, wherein said third motor is carried by said terminal body and comprises a first linear actuator located substantially parallel to said third axis (C).

3. An operating head according to claim 2, wherein said operating end comprises a focal lens adapted to focus the laser beam coming from said machine.

4. An operating head according to claim 1, wherein said second motor is carried by said base and comprises a second linear actuator located substantially parallel to said second axis (B).

5. An operating head according to claim 4, wherein the rotating body carries a tubular element fixed to the terminal body, the tubular element being connected in rotation to the tubular body through a linear prismatic guide arranged parallel to said second axis (B).

6. An operating head according to claim 5, wherein said tubular element is connected to a second actuator by a bearing that disengages the tubular element from the second actuator for movements around said second axis (B).

7. An operating head according to claim 6, wherein said second actuator engages a flange mounted around said tubular element with said bearing interposed.

8. An operating head according to claim 6, wherein said bearing is a cross roller bearing.

9. An operating head according to claim 1 wherein said control unit is configured to obtain a trajectory of the operating end from said sequence and to apply a filtering to said trajectory to obtain the first trajectory for the movable structure and the second trajectory of the operating head (W, B, C).

10. An operating head according to claim 9, wherein said control unit is configured to generate a trajectory of the movable structure such that a predefined point of said operating head follows a trajectory of a working point (TCP) on the operating end offset by a horizontal (KLA) and vertical (KLB) interaxis distances, said control unit being further configured to apply a filtering to said trajectory of the movable structure to obtain the first filtered trajectory and to calculate the second trajectory of the operating head to recover a positional error (E) between the trajectory of the working point (TCP) and the filtered trajectory, providing said trajectory of the movable structure and said second trajectory of the operating head to said servo controller for the actuation of the movable structure and of the operating head, respectively.

11. An operating head according to claim 9, wherein said control unit is configured to filter said trajectory of the movable structure, eliminating the high frequency components to obtain a filtered trajectory containing only low frequency components.

12. An operating head according to claim 9, wherein said predefined point of the operating head corresponds to the flange centre (CF) defined by the intersection of the first axis (A) with the second axis (B).

13. An operating head according to claim 9, wherein said first set of variables (X, Y, Z, A) comprises said first axis (A) as the orientation axis and that said trajectory of the movable structure is filtered by a first positioning filter and a second orientation filter.

14. An operating head according to claim 9, wherein said positioning filter and orientation filter operate at different filtering frequencies.

\* \* \* \* \*